US006999853B2

(12) United States Patent
Junk et al.

(10) Patent No.: US 6,999,853 B2
(45) Date of Patent: Feb. 14, 2006

(54) METHODS AND APPARATUS FOR OPERATING AND PERFORMING DIAGNOSTICS IN A CONTROL LOOP OF A CONTROL VALVE

(75) Inventors: Kenneth W. Junk, Marshalltown, IA (US); Annette L. Latwesen, Marshalltown, IA (US)

(73) Assignee: Fisher Controls International LLC., St. Louis, MO (US)

( * ) Notice: Subject to any disclaimer, the term of this patent is extended or adjusted under 35 U.S.C. 154(b) by 90 days.

(21) Appl. No.: 10/828,706

(22) Filed: Apr. 21, 2004

(65) Prior Publication Data

US 2004/0236472 A1 Nov. 25, 2004

Related U.S. Application Data

(60) Continuation-in-part of application No. 10/644,207, filed on Aug. 20, 2003, which is a division of application No. 10/139,008, filed on May 3, 2003, now Pat. No. 6,678,584.

(51) Int. Cl.
    G05D 11/00 (2006.01)
(52) U.S. Cl. .................. 700/282; 700/281; 251/129.01
(58) Field of Classification Search .............. 700/281, 700/282; 702/33, 114; 73/149, 168; 137/386; 60/443; 251/129.01, 339
    See application file for complete search history.

(56) References Cited

U.S. PATENT DOCUMENTS 4,061,155 A    12/1977 Sopha (Continued)

FOREIGN PATENT DOCUMENTS

EP    0370070 B1    5/1990

(Continued)

OTHER PUBLICATIONS

Beatty K: "Intelligent Valve Based Process Sensing and Control," Advances in Instrumentation and Control, Instrument Society of America, Research Triangle Park, U.S. vol. 46, No. Part 2, pp. 1175-1185XP000347557, Issue No. 1054-0032.

(Continued)

Primary Examiner—Jayprakash N. Gandhi
(74) Attorney, Agent, or Firm—Marshall, Gerstein & Borun LLP

(57) ABSTRACT

A control loop of a control valve is operated using outlet pressure from a pneumatic amplifier as the control parameter. The control loop may be operated continuously in pressure control mode, or may be switched from another mode, such as travel control mode, to pressure control mode in response to certain operating conditions such as operation in the cutoff range, operation with the throttling element engaging a travel stop, or as a backup in the event of primary control parameter sensor failure. Operating the control loop in pressure control mode further allows diagnostics to be performed on the control loop components, even when the system is operating in cutoff range or has engaged a travel stop. The diagnostics may be performed using pressure and displacement sensors normally provided with a positioner. A processor may be programmed to receive data from the sensors and generate fault signals according to a logic sub-routine. The logic sub-routine may include calculating mass flow of control fluid through pneumatic amplifier outlet ports and comparing other operating parameters to detect leaks and blockages in the control loop components. Once a fault is detected, the location of the root cause of the fault may be identified by characterizing operating parameters of the control loop at the time of the fault.

67 Claims, 8 Drawing Sheets

U.S. PATENT DOCUMENTS

| | | | |
|---|---|---|---|
| 4,274,438 A | | 6/1981 | La Coste |
| 4,976,144 A | * | 12/1990 | Fitzgerald .................... 73/168 |
| 4,976,546 A | | 12/1990 | Beattie |
| 5,272,647 A | * | 12/1993 | Hayes .......................... 702/45 |
| 5,425,270 A | * | 6/1995 | McDonald et al. ........... 73/168 |
| 5,558,115 A | | 9/1996 | Lenz et al. |
| 5,687,098 A | * | 11/1997 | Grumstrup et al. ......... 700/282 |
| 5,806,565 A | | 9/1998 | Kadlicko |
| 5,966,679 A | | 10/1999 | Snowbarger et al. |
| 6,128,541 A | | 10/2000 | Junk |
| 6,131,609 A | | 10/2000 | Metso et al. |
| 6,192,321 B1 | | 2/2001 | Grumstrup et al. |
| 6,382,226 B1 | | 5/2002 | Larson et al. |
| 6,408,735 B1 | | 6/2002 | Harvey et al. |
| 6,644,332 B1 | * | 11/2003 | Winkler ......................... 137/2 |
| 6,917,858 B1 | * | 7/2005 | Boger ........................ 700/282 |
| 2001/0035512 A1 | * | 11/2001 | Messer et al. ......... 251/129.04 |
| 2001/0037670 A1 | | 11/2001 | Boger et al. |
| 2002/0040284 A1 | | 4/2002 | Junk |
| 2003/0208305 A1 | | 11/2003 | Junk et al. |

FOREIGN PATENT DOCUMENTS

| | | |
|---|---|---|
| EP | 0462432 A2 | 12/1991 |
| EP | 1030231 A1 | 8/2000 |

OTHER PUBLICATIONS

A copy of a partial International Search Report for International application No. PCT/US03/03695, dated Jul. 2, 2003, 7 pages.

A copy of International Search Report for International Patent Application No. PCT/US03/03695, dated Sep. 9, 2003, 10 pages.

Copy of International Search Report for International Patent Application No. PCT/US05/008712, dated Jul. 4, 2005, 8 pages.

Copy of Written Opinion for International Patent Application No. PCT/US05/008712, dated Jul. 7, 2005, 5 pages.

* cited by examiner

METHODS AND APPARATUS FOR OPERATING AND PERFORMING DIAGNOSTICS IN A CONTROL LOOP OF A CONTROL VALVE

CROSS-REFERENCE TO RELATED APPLICATIONS

This application is a continuation-in-part of prior application Ser. No. 10/644,207, filed Aug. 20, 2003, that is in turn a divisional of application Ser. No. 10/139,008, filed May 3, 2003, now U.S. Pat. No. 6,678,584, issued on Jan. 13, 2004.

FIELD OF THE DISCLOSURE

The present disclosure generally relates to control valves and, more particularly, to methods and apparatus for operating a control loop for controlling the control valve and for performing diagnostics on the control loop components.

BACKGROUND OF THE DISCLOSURE

Control valves are used to regulate process fluid flow through a pipe or conduit. Such valves typically include a throttling element disposed in the process fluid flow path and connected to an actuator. While various types of actuators are known, many control valves use a pneumatic actuator which uses air, natural gas, or other fluid under pressure to adjust the position of the actuator. In a spring and diaphragm actuator, for example, a spring applies a force to one side of the actuator while fluid pressure is controlled on an opposite side of the actuator, thereby adjusting the position of the throttling element. Alternatively, a piston actuator may be used in which the piston divides the actuator housing into upper and lower chambers and the fluid pressures of both chambers are controlled to drive the actuator to a desired position. In any type of pneumatic actuator there may be a nominal bleed-off of the control fluid to atmosphere.

A positioner, through internal servo control, manages the fluid pressure supplied to one or both chambers of a pneumatic actuator. The positioner typically includes a processor and interface circuitry, a current to pressure (I/P) converter, a second stage pneumatic amplifier (i.e., a spool valve or pneumatic relay), and a valve travel feedback sensor. The processor generally monitors input or command signals and feedback signals through the interface circuitry. The servo action programmed within the processor creates an electronic corrective signal that is supplied to the I/P converter. The I/P converter is connected to a supply pressure and delivers a desired control fluid pressure or pneumatic control signal to the second stage pneumatic amplifier. Subsequently, the pneumatic control signal directs the control fluid through the second stage pneumatic amplifier toward a chamber of the actuator creating a movement in the actuator. Movement of the actuator causes a corresponding movement of the throttling element, thereby to control flow of its process fluid. Thus, the positioner responds to the command signal, typically from a process controller, and compares the reference signal to valve travel feedback, thereby to drive the I/P converter (and second stage pneumatics) to move the valve toward a position corresponding to the reference signal.

With the growing use of processor-based control, the spool valves used in positioners have become heavily instrumented. When used with a piston actuator, for example, the spool valve will include an inlet port for receiving supply pressure, a first outlet port fluidly communicating with a first chamber of the actuator, and a second outlet port fluidly communicating with a second actuator chamber. Spool valves are known in which a pressure sensor is positioned at the inlet port, first outlet port, and second outlet port for providing feedback to the processor. In addition, conventional spool valves include a displacement sensor for detecting the position of the spool valve and providing a feedback signal to the processor.

Conventional positioners have components that are susceptible to various control fluid leaks or blockages that may degrade or disable operation of the control valve. The I/P converter, for example, includes an inlet having a sealed connection with the supply pressure. The I/P converter includes a restriction defining a primary orifice and a nozzle for directing control fluid toward a flapper. The I/P converter further includes a sealed outlet for directing control fluid to a spool valve. The I/P converter is often located at an industrial site where the surrounding air may be contaminated with oil, dissolved minerals, grit, and the like. Consequently, when such air is used as the control fluid, the contaminants may partially or completely plug the primary orifice or nozzle. In addition, the seals provided at the inlet and outlet of the I/P converter may fail. Such blockages or leaks may slowly degrade the performance of the control valve, resulting in inefficiencies, or may cause complete failure of the control valve. In either event, it is difficult to determine that the positioner is the cause of the fault, let alone to determine the specific location of the fault within the positioner.

Similarly, leaks may develop in the actuator housing or blockages may form in the connections between the spool valve and the actuator that may degrade control valve performance or cause failure. For example, a leak may form between the upper or lower actuator chamber and atmosphere, or a piston ring may fail causing leakage from one chamber to the other. In any of these circumstances, the processor must adjust its control signal for a given position of the throttling element. Leak detection is particularly important when the control medium is natural gas. Such leaks may develop over time and, in a noisy plant environment, may go unnoticed until the valve no longer operates.

DETAILED DESCRIPTION

Figure 1:
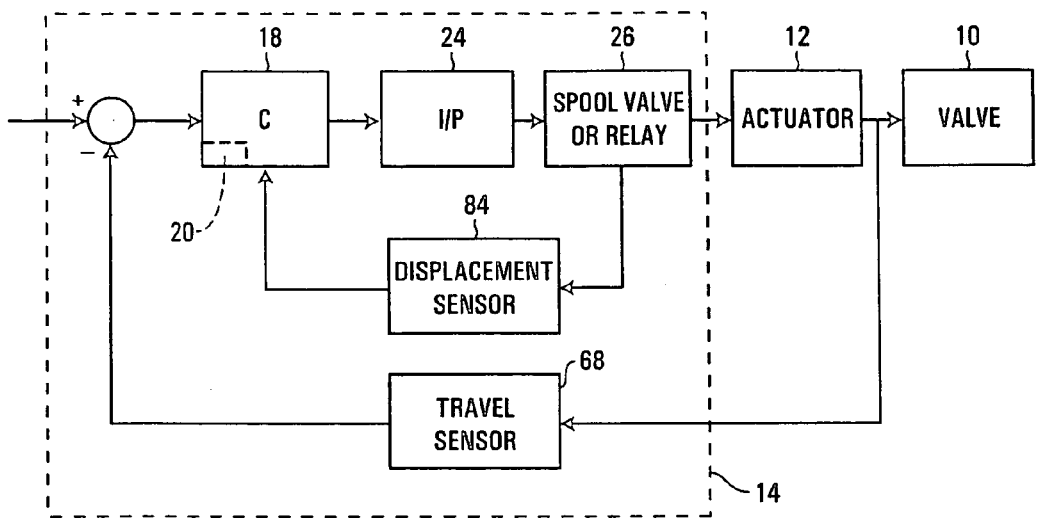
FIG. 1 is a schematic block diagram of a positioner attached to an actuator for a control valve.

A positioner 14 is schematically illustrated in FIG. 1 connected to an actuator 12. The actuator 12 is mechanically coupled to a valve body 10, which controls the flow of a process fluid through a conduit, such as a pipe (not shown). The positioner 14 includes a processor 18 having a memory 20, an I/P converter 24, second stage pneumatics (such as spool valve 26 or pneumatic relay 200), a control fluid valve assembly displacement sensor 84, and a valve travel sensor 68, collectively referred to herein as a control loop. A reference signal, such as a command signal from a process controller, is provided to the positioner 14 and represents a desired actuator position. The positioner 14 compares the reference signal to the actual actuator position provided by the travel sensor 68 and forwards an error signal to the processor 18. The processor then generates an electronic I/P drive signal based on the error signal and feedback from the displacement sensor 84.

Figure 2:
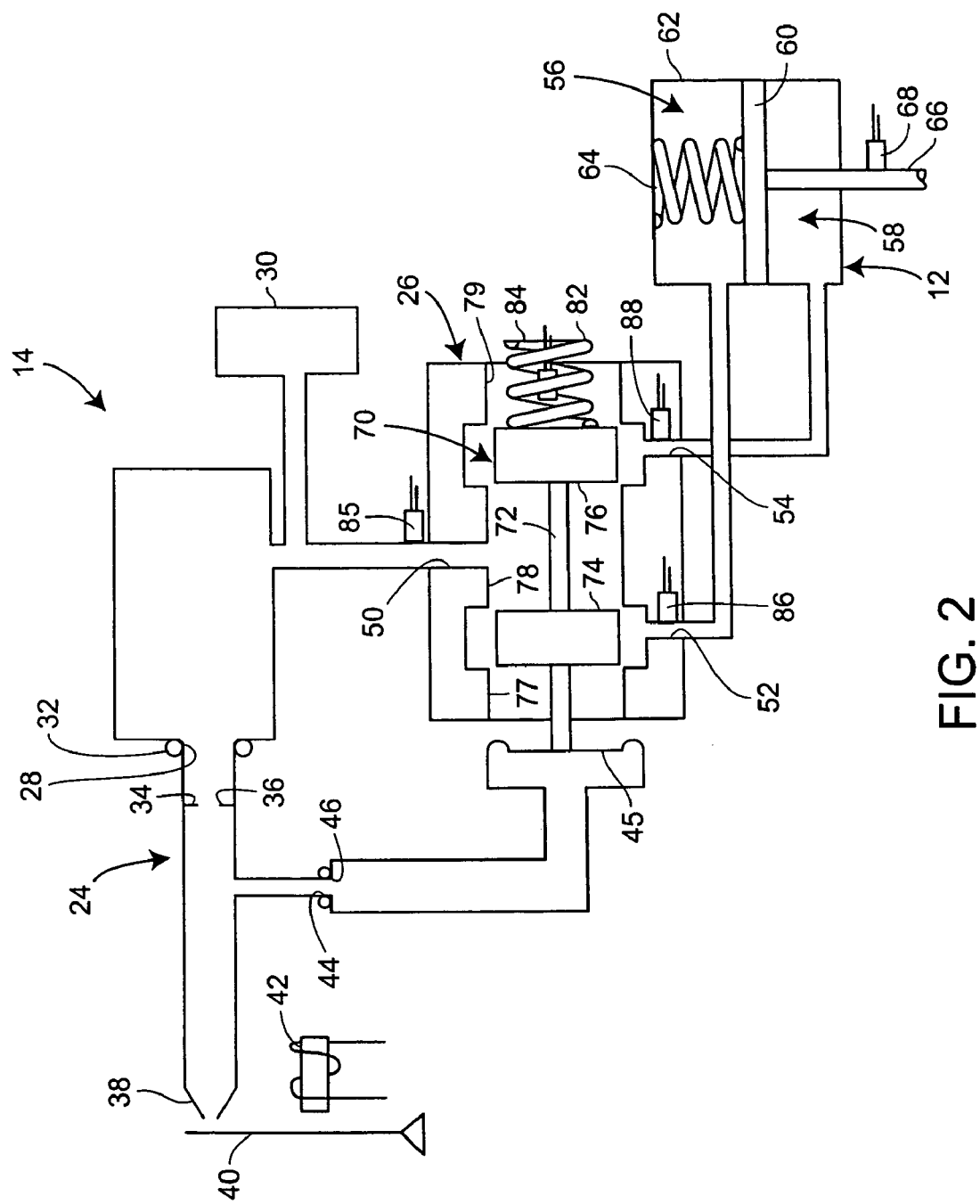
FIG. 2 is an enlarged schematic representation of one embodiment of the positioner shown in FIG. 1.

As shown in greater detail in FIG. 2, the actuator 12 includes a piston 60 which divides the actuator housing 62 into the upper and lower chambers 56, 58. The upper chamber 56 includes a spring 64 for applying a force to the piston. A stem 66 extends from the piston 62 to the valve body 10. A travel sensor 68 may be provided for detecting the position of the stem 66 and providing feedback to the processor 18.

According to the illustrated embodiment, the I/P converter 24 provides a signal amplification stage and the spool valve 26 provides a pneumatic amplification stage. The I/P converter 24 includes an inlet 28 in fluid communication with a supply of control fluid under pressure 30. A connection between the inlet 28 and control fluid supply 30 may be sealed with an O-ring 32. A restriction 34 disposed in the I/P connector 24 defines a primary orifice 36. A nozzle 38 is provided downstream from the primary orifice 36 for directing control fluid toward a flexible flapper 40. In the illustrated embodiment, a solenoid coil 42 is provided for positioning the flapper 40 with respect to the nozzle 38. Alternatively, the solenoid coil-based I/P converter 24 may be removed and the flapper 40 function may be formed from a piezoelectric material, or any other known flapper construction may be used. An outlet 44 fluidly communicates with a diaphragm 45. The connection between the outlet 44 and the diaphragm 45 may be sealed by an O-ring 46. A sensor 85 may be provided for detecting a supply pressure of the control fluid entering the I/P converter 24.

The spool valve 26 includes an inlet port 50 for receiving control fluid from the control fluid supply 30. First and second outlet ports 52, 54 may be provided in fluid communication with upper and lower chambers 56, 58 of the actuator 12. A valve member 70 is disposed inside the spool valve housing for controlling fluid communication between the inlet port 50 and the first and second outlet ports 52, 54. In the illustrated embodiment, the valve member 70 includes a rod 72 carrying first and second lands 74, 76. An annular valve chamber 77 is formed in the spool valve housing and sized to closely fit the first and second lands 74, 76. The diaphragm 45, which receives a pressure signal from the I/P converter 24, engages a first end of the valve member 70. A spring 82 engages an opposite end of the valve member 70 to apply a bias load to the valve member 70.

In operation, a control fluid pressure regulated by the I/P converter 24 is output to the diaphragm 45 which applies a load to the valve member 70 in a direction opposite the bias load of the spring 82. Movement of the first and second disks, 74, 76 will partially or completely block fluid flow from the inlet port 50 to either of the first and second outlet ports 52, 54. Accordingly, the position of the valve member 70 determines an area of restriction for each outlet port 52, 54 through which control fluid may flow. A displacement sensor 84 is located to detect a position of the valve member 70 and provide feedback to the processor 18. In addition, first and second outlet pressure sensors 86, 88 are provided for detecting control fluid pressure levels at the first and second outlet ports 52, 54, respectively.

While FIG. 2 illustrates a double-acting piston actuator with fail-closed spring action, it will be appreciated that other types of pneumatic actuators may be used. Examples of alternative actuators include a double-acting piston actuator with fail-open spring action, a double-acting piston actuator with no spring, a single-acting spring-and-diaphragm actuator with fail-open or fail-closed spring action, or any known substitute. If the actuator is single-acting, the spool valve 26 includes a single outlet port in fluid communication with the actuator chamber opposite the spring.

Figure 6:
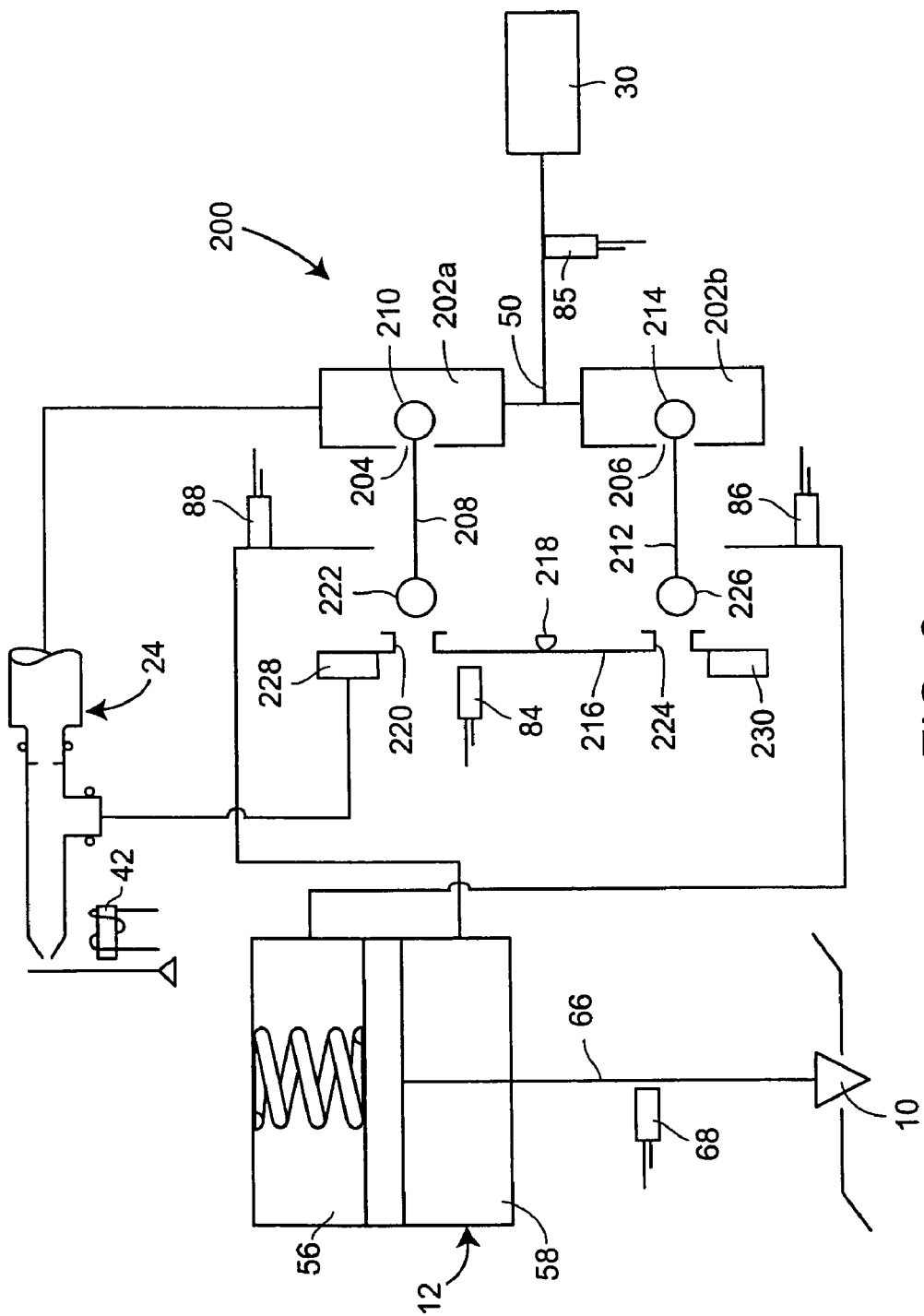
FIG. 6 is a schematic representation of an alternative embodiment of the positioner shown in FIG. 1.

Still further, the positioner 14 may use alternative means for the second stage pneumatics. Instead of the spool valve 26, the positioner may include, for example, a pneumatic relay. A double-acting pneumatic relay 200 is illustrated in FIG. 6 attached to the I/P converter 24, valve body 12, and source of pressurized supply fluid 30. The relay 200 includes supply pressure plenums 202a, 202b. Plenum 202a includes a first outlet port 204 in fluid communication with the actuator lower chamber 58, while plenum 202b has a second outlet port 206 in fluid communication with the actuator upper chamber 56. A first poppet valve 208 has an end 210 positioned to removably engage the first aperture 204, while a second poppet valve 212 has an end 214 positioned to removably engage the second aperture 206. A beam 216 is supported for rotation about fulcrum 218, and includes a first orifice 220 positioned to engage a second end 222 of the first poppet valve 208 and a second orifice 224 positioned to engage a second end 226 of the second poppet valve 212. Output from the I/P converter 24 is provided to chamber 228 to rotate the beam 216 in a first direction (i.e., clockwise in FIG. 6) while a reference chamber 230 is provided with a reference pressure to counterbalance the force of the chamber 228. The first poppet valve 208 controls flow of control fluid to the actuator lower chamber 58 while the second poppet valve 212 controls flow to the actuator upper chamber 56.

In operation, when the I/P nozzle pressure increases, the beam 216 will rotate clockwise forcing the first poppet valve 208 to the right. The second end 222 of the first poppet valve 208 closes off the first orifice 220 to prevent flow to atmosphere, while the first end 210 of the first poppet valve 208 opens the first outlet port 204 to allow control fluid at the supply pressure to flow to the lower chamber 58. At the same time, the second poppet valve 212 opens the second orifice 224 and closes the second outlet port 206 to allow control fluid to exhaust from the upper chamber 56 to atmosphere. The opposite occurs when the I/P nozzle pressure decreases. It will be appreciated that as the first and second poppet valves 208, 212 move into and out of the first and second outlet ports 204, 206, the area of restriction of the outlet ports 204, 206 are varied. Accordingly, the position of the beam 216 may be used to infer the position of the poppet valves 208, 212 and, therefore, the area of restriction through the first and second outlet ports 204, 206.

The positioner with pneumatic relay 200 may include the same sensors as described above. Accordingly, the first and second outlet pressure sensors 86, 88 are positioned near the first and second outlet ports 52, 54 to detect control fluid pressure to the upper and lower actuator chambers 56, 58, respectively. The inlet pressure sensor 85 is positioned at the inlet port 50 to detect control fluid supply pressure, while the actuator travel sensor 68 is positioned to detect the position of the stem 66. In addition, the displacement sensor 84 is positioned to detect the position of the beam 216.

The positioners described above are generally known in the art. Up to now, however, the displacement sensor 84 has been used strictly to provide feedback. In accordance with the teachings of the present disclosure, the displacement sensor 84 may also be used for diagnostic purposes. In addition, the various sensors may be used to discriminate between the various fault conditions possible in the positioner. The sensors may also be used to calculate mass flow of control fluid, which may be used to help identify root causes of the faults. The diagnostic calculations and analysis may be performed by a diagnostics unit provided with the positioner 14, such as where the processor 18 and memory 20 function as the diagnostics unit, or in a remote host 19 communicatively coupled to the positioner 14.

With respect to the actuator 12, the diagnostics unit may be programmed with a diagnostics routine that uses feedback from the sensors to estimate mass flow of control fluid to the actuator chambers. The diagnostics routine may further use the calculated mass flows, with or without additional feedback parameters, to identify leaks or other faults in the actuator. More specifically, the mass flow of control fluid through the first and second outlet ports may be approximated using the following equation:

$$dm/dt = KYAg_c(2\rho(p_1-p_2))^{1/2}$$

where:
dm/dt=mass flow rate (lbm/s);
K=a discharge coefficient;
Y=an expansion factor;
A=an area of restriction (ft$^2$);
g$_c$=a conversion constant (lbm/slug);
p$_1$=upstream pressure (lbf/ft$^2$, abs.);
P$_2$=downstream pressure (lbf/ft$^2$, abs.); and
ρ=an upstream fluid density (slug/ft$^3$).

To calculate mass flow through the first outlet port 52, for example, the appropriate coefficients and variables are inserted into the above equation. Upstream pressure p$_1$ is the inlet pressure sensed by pressure sensor 85 and p$_2$ is the pressure detected by sensor 86 at the first outlet port 52. The equation may be used to estimate both supplying and exhausting mass flows. For example, when spool valve displacement is positive (i.e., to the right in FIG. 2), port 54 will supply control fluid to the lower actuator chamber while port 52 exhausts control fluid from the upper actuator chamber. For port 54, spool valve displacement may be used to calculate the exposed port area and sensors 85, 88 may provide the upstream and downstream pressures. For port 52, spool valve displacement may be used to calculate the exposed port area and sensor 85 may provide upstream pressure. A sensor on the exhaust port is not required since the spool exhausts to atmosphere, which is at a known pressure. In addition, supply pressure to the control valve is often regulated, and therefore the supply pressure sensor 85 may be eliminated and a fixed value that approximates the supply pressure may be substituted into the air mass flow equation.

When the control fluid is air, the above equation may be reduced to:

$$dm/dt = 0.048 \, KYA(p_1(p_1-p_2))^{1/2}$$

The mass flow equation may be similarly reduced for other fluids, such as natural gas. In addition to the above-noted equations for estimating mass flows through an orifice, standard flow equations, such as those noted in ISA-575.01-1985: *Flow Equations For Sizing Control Valves*, may be used. The mass flow estimates obtained by the above equations have been found to closely match measurements made with an external air mass flow sensor, especially when using a low-pass digital filter to attenuate bit noise. Accordingly, the diagnostics unit 18 may be programmed to receive feedback from the pressure sensors 85, 86, 88 and the displacement sensor 84 and calculate mass flow through the first and second outlet ports 52, 54 using the above equation. The above equations may be modified to correct for leakage flow across the lands, and may also be used to calculate mass flow through alternative second stage pneumatics, such as the pneumatic relay 200 of FIG. 6.

Figure 3A:
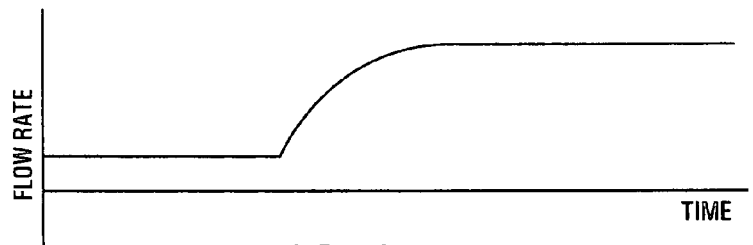
FIGS. 3A and 3B are graphs illustrating control fluid mass flow profiles for a spring and diaphragm actuator experiencing leak and blockage, respectively.

The diagnostics routine may use the mass flow calculations to identify leaks or blockages between the spool valve and the actuator 12. For example, in a spring-and-diaphragm actuator, control fluid is provided to a single actuator chamber opposite the spring. During normal operation, the processor 18 controls output of control fluid from the spool valve 26 to drive the actuator 12 and connected throttling element to a desired set point. During steady state operation, a small amount of fluid may bleed to atmosphere, and therefore a small amount of control fluid will flow through the spool valve outlet port. If a leak develops in the actuator chamber or in the connection between the spool valve outlet port and the actuator, the pressure level inside the actuator chamber will drop and the spring will cause the actuator to move from its desired position. Feedback regarding process fluid pressure and/or actuator travel is provided to the processor 18, and the processor 18 will alter the drive signal to the I/P converter 24 to increase control fluid flow to the actuator. Consequently, mass flow to the actuator will increase as illustrated in the graph provided at FIG. 3A. By estimating mass flow of control fluid over time, the diagnostics unit may be programmed to detect increases in control fluid flow to the actuator. The diagnostics unit may further be programmed with a maximum control fluid flow rate above which the diagnostics routine will generate a fault signal. A low pass filter may be used to minimize the chance of normal transients generating a false signal.

Figure 3B:
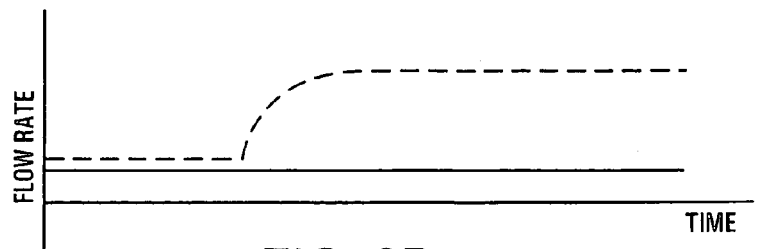

Conversely, blockage in the air line between the spool valve and the actuator 12 may be identified when control fluid flow is constant as spool valve displacement increases. FIG. 3B illustrates a blockage situation, where the solid line represents mass flow and the dashed line represents spool displacement. Similarly, a partial blockage may be identified if spool displacement is large but mass flow is relatively small.

Detecting leaks in a piston actuator is slightly more complicated. The leak may occur in the actuator chamber with the spring, the actuator chamber without the spring, or between the actuator chambers, such as when there is a leak in a piston ring or when a bypass valve on the actuator has been left open. As with the spring-and-diaphragm actuator, however, deviation in air mass flow can be used to locate and quantify leaks or obstructions.

To help identify faults, deviations from normal operating parameters may be identified. One such parameter is the pressure inside the actuator chambers, which is typically maintained at roughly 60–80% of the supply pressure. An average or "crossover" pressure may be determined by averaging the pressures in the actuator chambers.

Figure 4A:
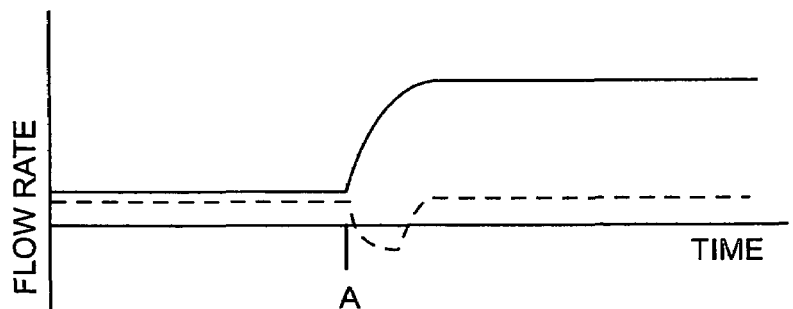
FIGS. 4A, 4B, and 4C are graphs illustrating control fluid mass flow profiles for a piston actuator experiencing control fluid leaks in a first chamber, second chamber, and piston ring, respectively.
Figure 4B:
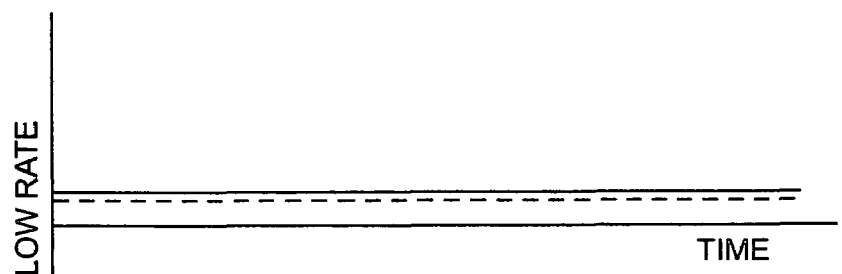

If there is a leak to atmosphere in the chamber opposing the spring, the processor 18 will move the spool valve 26 to provide make-up air to that chamber. This will also depressurize the chamber with the spring, so that the piston actuator behaves effectively like a spring and diaphragm actuator. The mass flow profile through the first and second outlet ports 52, 54 for such a leak are shown in FIG. 4A. Initially, there is a nominal mass flow through both outlet ports 52, 54 due to normal leakage in the system. When a leak develops at point A, mass flow to the chamber with the leak will increase to equal the amount of air exhausted to atmosphere, as shown by the solid line in FIG. 4A. For the chamber with the spring, mass flow will be temporarily out of the chamber as the actuator moves to a new position, but will eventually return to near zero since the chamber is depressurized, as shown in the broken line in FIG. 4A. Furthermore, the crossover pressure in the actuator will be approximately one-half of the pressure in the chamber opposite the spring.

If a leak develops in the spring-side chamber of the actuator, the positioner 14 does not provide make-up air since that would require the positioner to exhaust air (and reduce the force) from the chamber opposing the spring. Accordingly, the processor 18 allows the chamber with the spring to become depressurized and will control the valve by adjusting the pressure in the opposite chamber. At steady state, air mass flow to the spring-side chamber will be near zero, air mass flow from the chamber opposing the spring will be near zero, and the crossover pressure will be one-half of the pressure in the chamber without the spring. Accordingly, by detecting the decreased crossover pressure in the mass flow profiles through each port, the presence and location of a leak may be determined.

The mass flow calculations may further be used by the diagnostics unit to detect leaks which result in control fluid flowing from one actuator chamber to the other, such as leaks in the piston ring. Such a leak may be difficult to detect using traditional measurement techniques since each chamber may remain pressurized. If the leak causes control fluid flow from the lower chamber 58 to the upper chamber 56, for example, the positioner 14 will move the spool to provide make-up control fluid to the lower chamber 58. At the same time, however, control fluid will flow from the lower chamber 58 to the upper chamber 56 and back to the spool valve 26.

Figure 4C:
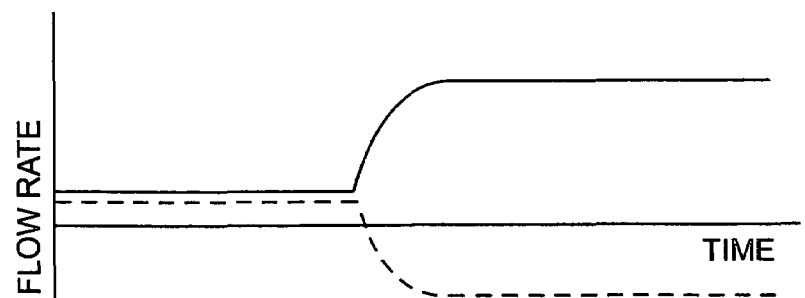

A graph illustrating fluid flow profiles through each outlet port 52, 54 for a piston ring leak is provided at FIG. 4C, wherein fluid flow through the first outlet port 52 is shown in a dashed line while fluid flow through the second outlet port 54 is shown in a solid line. Initially, each port has a nominal flow rate that discharges to atmosphere. When the leak in the piston ring develops, mass flow through the second outlet port 54 increases while mass flow through the first outlet port 52 decreases by a proportional amount. Unlike conventional mass flow sensors which do not indicate the direction of fluid flow, the mass flow approximation equation indicates direction of flow, wherein a positive number represents fluid flow into the actuator while a negative number represents fluid flow out of the actuator.

Accordingly, by monitoring control fluid flow through the first and second outlet ports 52, 54, the processor 18 may detect a sustained situation where fluid flow through one port is positive while fluid flow through the other port is negative, and generate a fault signal.

In addition to detecting control fluid leaks and blockages to the actuator, the pressure and displacement sensors of the spool valve may also be used to detect faults in the I/P converter 24 located upstream of the spool valve 26. Various types of faults may occur in the I/P converter 24 that will disrupt or stop control fluid flow to the spool valve 26, thereby degrading or disabling control valve operation. Because specific components of the I/P converter, such as the flapper 40, are not directly applicable to servo control, these components are not typically instrumented. It has been found, however, that the sensors provided with the spool valve 26 may be used to infer the internal states of the I/P converter components.

Before addressing the specific faults that may occur in the I/P converter 24, it should be noted that the control fluid supply 30 that provides pressurized control fluid to the I/P converter may fail, and therefore this fault should be addressed before considering other failures in the I/P converter 24 itself. Accordingly, the signal provided by the inlet pressure sensor 85 may be used to detect whether the control fluid supply 30 has lost pressure.

One fault that may occur within the I/P converter 24 is the complete plugging of the primary orifice 36. When the primary orifice 36 is plugged, pressure to the diaphragm 45 will decrease so that the spring 82 moves the spool valve 70 to a zero pressure (or negative) state, causing the actuator to move accordingly. The processor 18 will increase the drive signal to the solenoid coil 42 in an attempt to close or cap off the nozzle 38, which normally would increase control fluid pressure exiting the outlet 44. Instead, the plugged primary orifice 36 prevents any flow of control fluid.

A fault may also arise when mineral deposits or other contaminants build up on the flapper 40 so that the nozzle 38 is completely plugged. In this case, control fluid pressure out of the outlet 44 increases to the supply pressure and causes the spool valve to move away from a null position to a positive position, thereby moving the actuator. In response, the processor 18 will decrease the drive signal to the I/P converter 24 in an attempt to open or uncap the nozzle 38.

Alternatively, the primary orifice may become partially plugged. As with a completely plugged primary orifice, a partial plugging will move the drive signal higher as the processor 18 attempts to compensate for the reduced air to the nozzle 38. A partially plugged primary orifice will slow down movement of the spool valve in response to changes in the I/P signal. Increased time constant may, however, result from low ambient temperature, which stiffens the diaphragm. In any event, when the I/P drive signal is high and all other states are operating properly, then it may be inferred that the primary orifice is partially plugged.

Similarly, the nozzle 38 may become partially plugged. Partial plugging of the nozzle 38 also affects the time constant of the I/P converter which, as noted above, may also be caused by the effect of changes in ambient temperature on the diaphragm. Accordingly, a low I/P drive signal with all other states nominal may indicate a partially plugged nozzle.

A further fault may arise from failure of the outlet O-ring 46. To compensate for a leak through the outlet-ring 46, the processor 18 will increase the drive signal, but the time constant of the I/P converter will not be altered significantly.

Accordingly, failure of the outlet O-ring 46 will affect operation of the control loop in a manner similar to a plugged primary orifice 36.

Further faults in addition to those specifically noted above may also occur in the I/P converter. For example, the solenoid coil 42 may fail or the flapper 40 may break. While it may not be possible to discern the specific failure, each fault may be detected by monitoring for significant deviations in the drive signal to the I/P converter. This may be accomplished by putting a linear or nonlinear digital filter on the drive signal to remove high frequency content and looking for deviations from normal operating conditions.

To help identify and characterize various faults in the I/P converter 24, the diagnostics unit, such as the processor 18 and memory 20 of the positioner 14 or the remote host 19 having a processor and memory, may be programmed to perform a diagnostics routine based on the parameters measured by various sensors of the positioner 14. The diagnostics routine may include one or more logic subroutines in which the measured parameters are characterized to develop a fault template, which may be used to identify one or more root causes for a fault.

A fault must first be detected before it may be characterized. The diagnostics routine may be programmed to detect sustained deviations in the I/P drive signal. The I/P drive signal may be set at approximately 70% to center the control fluid valve assembly of the pneumatic amplifier at its null position. A normal operating range for the drive signal may be 60–80%. Accordingly, the diagnostics routine may generate a fault signal when the I/P drive signal moves outside of the normal operating range (i.e., less than 60% or more than 80%). An order statistics filter may be used to remove normal transients, so that a fault signal is generated only when the I/P drive signal is outside of the normal range for a sustained period of time. Alternatively, the diagnostics unit may be programmed to monitor for large shifts in the nominal position of the control fluid valve assembly, or to monitor an error signal (i.e., deviation of reference from valve stem travel, outlet port pressure, or other control parameter), to trigger a fault analysis. In either event, once a fault has been detected, control fluid pressure at the supply 30 should first be checked so that it may be ruled out as a cause of the fault.

Once a fault has been detected, it may be characterized to determine its general or specific location within the control loop. After the deviation has been detected in the I/P drive signal, the fault can be located by tracing the deviation back through the control loop. For a blocked primary orifice 36 in a positioner system using a stem travel reference signal, for example, the control loop will be affected as follows: flow through the primary orifice 36 will stop, causing the spool valve to move to its zero pressure (negative) state, which in turn decreases pressure in the actuator chamber, which causes the throttling element to move, which generates an error signal back to the processor. The processor will increase the I/P drive signal to compensate for the fault.

To identify the specific location of the fault, one must proceed backwards through this chain of events. For the completely plugged primary orifice example, the analysis begins with detection of an I/P drive signal above the upper limit of the normal operating range (i.e., a positive I/P drive signal deviation). Next, the error signal generated by movement of the throttling element is characterized as largely positive, which means the actual actuator travel is less than desired. A differential pressure between outlet port pressures, where the pressure at the first inlet port 52 is subtracted from the pressure at the second outlet port 54, may then be characterized as being negative. Next, the displacement sensor 84 provides feedback regarding the spool valve position, which would be characterized as largely negative with respect to its null position due to the control fluid pressure reduction caused by the blockage. By characterizing the measured parameters in this fashion, certain root causes for the fault may be eliminated. Several root causes may have the foregoing characteristics, of which a blocked primary orifice is one.

Figure 5:
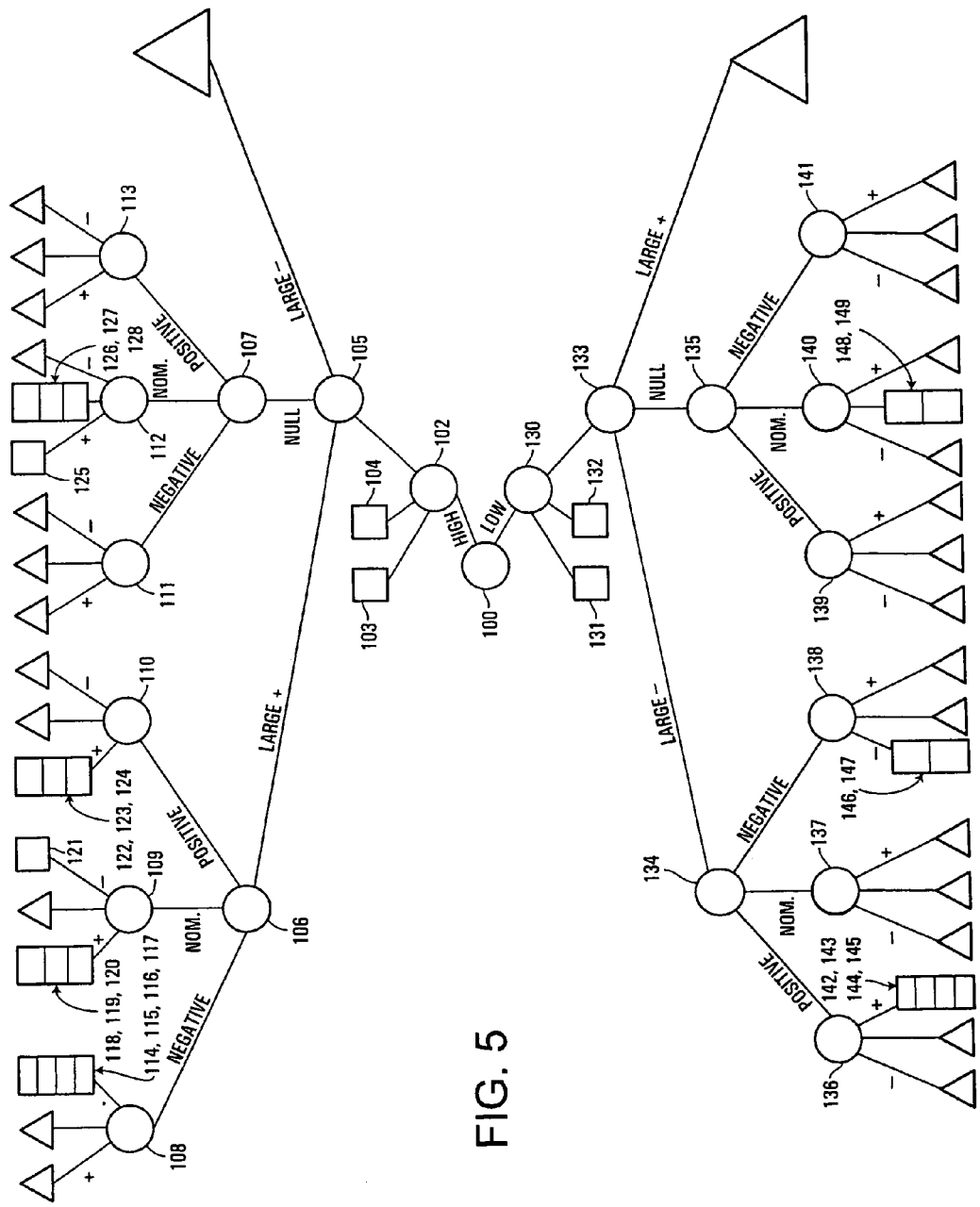
FIG. 5 is a decision tree schematically illustrating a logic sub-routine for characterizing and locating component faults.

In a similar fashion, all faults may be mapped out using a decision tree, as illustrated in FIG. 5. In FIG. 5, measured variables are denoted by circles, the characterized values of those parameters are labeled on the lines emanating from the circles, and component failures are denoted by squares. Triangles denote invalid regions such as, for example, the combination of a large drive signal and a large negative error signal, which is not possible. The diagnostics routine illustrated in FIG. 5 is based on existing sensors commonly provided with positioners, and therefore certain component failures that are indistinguishable have been grouped together in FIG. 5. Additional sensors may be used to further distinguish the grouped component failures. Component faults cascade down through the tree until the I/P drive signal deviates. The root cause of the deviation may then be identified by moving backwards through the tree. FIG. 5 and its related description assume that the reference signal is generated with respect to valve stem travel. It will be appreciated that similar diagnostics may be performed in systems having a reference signal tied to other control parameters, such as the fluid pressure delivered to the actuator by the pneumatic amplifier.

Returning to FIG. 5, at measurement 100 the diagnostics routine may detect an I/P drive signal that deviates from the normal operating range. The drive signal may be characterized as high if it is above the range and low if it is below the range. If the I/P drive signal is high, the stored diagnostics routine will proceed up in the tree to characterize a reference signal used in the control loop. The reference signal may be the command signal sent to the positioner from a process controller. In this embodiment, the I/P drive signal is a function of the difference between the reference and travel feedback.

Figure 8:
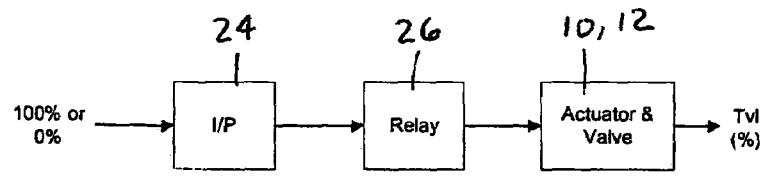
FIG. 8 is a schematic block diagram, similar to that of FIG. 1, depicting how cutoffs may be implemented in the positioner.

There are three scenarios where the I/P drive signal may be above or below its normal operating point, two of which are not the result of an equipment fault. The first is when the positioner is in "cutoff." Cutoff occurs when the reference signal exceeds a user-defined threshold. When in high-cutoff, the servo controller is bypassed altogether and a 100% drive signal is sent to the I/P. When in low-cutoff, the servo controller is bypassed and a 0% drive signal is sent to the I/P. An example of how cutoffs may be implemented is depicted in the schematic block diagram of FIG. 8. Both high- and low-cutoff are valid operating regions, and do not indicate an equipment fault. High- and low-cutoff are indicated in FIG. 5 at boxes 103, 131, respectively.

The second scenario is when the valve body engages a travel stop. When the valve body hits a stop, travel feedback is no longer active and the process controller essentially operates open-loop. Again, this is normal control valve behavior and does not indicate an equipment fault. High and low travel stops are indicated in FIG. 5 at boxes 104, 132, respectively.

The third scenario is where an equipment fault has caused a large error signal. In order to compensate for a large error signal, the I/P drive signal is adjusted accordingly. Once cutoffs and travel stops are ruled out, the analysis may proceed along the decision tree set forth in FIG. 5. For a high I/P drive signal, the analysis proceeds up the tree, while for a low I/P drive signal, the analysis proceeds down the tree.

A high I/P drive signal is first analyzed by characterizing the error signal at 105. The error signal may be classified as largely positive, null, or largely negative. When the I/P drive signal is high, it is not possible to have a large negative error signal, and therefore the upper right branch of FIG. 5 indicates that all outcomes are not valid. Accordingly, the only possible outcomes from the error signal characterization 105 are largely positive (i.e., the reference signal is greater than the actual travel feedback signal) or null. In either event, the diagnostics routine will next proceed to characterize a pressure differential between the first and second outlet ports 52, 54 by subtracting the pressure at the first outlet port 52 from the pressure at the second outlet port 54, as indicated at 106, 107. The pressure differential may be characterized as being negative near the supply pressure, nominal, or positive near the supply pressure. A negative pressure differential indicates that pressure at the first outlet port 52 is greater than that at the second outlet port 54. The converse is true for a positive pressure differential. A nominal pressure differential indicates that the actuator chambers are substantially balanced. For each pressure differential characterization, the diagnostics routine will proceed to characterize the position of the spool valve, as indicated at 108–113. The spool valve position may be characterized as being largely positive, null, or largely negative. A large positive position indicates that the diaphragm 45 has pushed the spool valve too far, while a large negative means the opposite. The spool valve is at the null position when it remains within a normal operating range.

Once the spool valve position has been characterized, one or more potential root causes may be identified for the I/P drive signal deviation. If, for example, the spool valve is jammed 114, the outlet O-ring 46 has failed 115, the diaphragm 45 has failed 116, or the primary orifice 36 is completely plugged 117, the diagnostics routine will have characterized the fault as having the largely negative spool position, a negative pressure differential, and a largely positive error signal for a high I/P drive signal. If the fault is characterized as having a largely positive spool valve position, a nominal pressure differential, and a largely positive error signal for a high I/P drive signal, the root cause may be an external leak 118, a worn spool valve 119, or a low supply pressure 120. For a fault having a largely negative spool valve position, nominal pressure differential, and a largely positive error signal for a high I/P drive signal, the root cause may be a low pressure supply 121.

If, for a high I/P drive signal, the error signal is largely positive, the pressure differential is positive, and the spool valve position is largely positive, the root cause may be the valve body being stuck in a low position 122, a blocked air line between the spool valve and the actuator 123, or an active interlock 124.

If a fault is characterized as having a largely positive spool valve position, a nominal pressure differential, and a null error signal for a high I/P drive signal, the root cause may be an external leak 125. If the spool position is characterized as null, the pressure differential is nominal, and the error signal is null for a high I/P drive signal, the root cause for the fault may be a primary orifice 36 that is partially plugged 126, the presence of grit in the I/P flapper or armature 127, or an I/P calibration shift 128.

Turning to the bottom half of FIG. 5, the diagnostics routine may conduct a similar process for a low I/P drive signal. After ruling out low-cutoff 131 and low travel stop 132, the analysis proceeds to characterize the error signal at 133. Error signal characterization is similar to that at 105 described above, wherein the error signal may be largely negative, null, or largely positive. It is not possible to have both a low I/P drive signal and a largely positive error signal, and therefore the outcomes show at the bottom left portion of FIG. 5 are all indicated as being not valid. After error signal characterization, the diagnostics routine will characterize a pressure differential at 134 and 135. Finally, the diagnostics routine will characterize the position of the spool valve at 136–141.

As with a high drive signal deviation, analysis of a low drive signal deviation proceeds with identifying one or more possible root causes. If the error signal is largely negative, the pressure differential positive, and the spool valve position largely positive, the root cause for the fault may be a nozzle 38 that is blocked 142, a pressed I/P flapper or armature 143, a latched I/P 144, or a jammed spool valve 145. If the error signal is largely negative the pressure differential is negative, and the spool valve position is negative, the root cause for the fault may be the valve body stuck in a high position 146 or a blocked air line 147. Finally, if the error signal is null, the pressure differential is nominal, and the spool valve position is null, the root cause for the fault may be an I/P calibration shift 148, or a nozzle 38 that is partially plugged 149.

The diagnostics routine may further classify component faults according to severity and provide predictive diagnostics. Certain root causes, such as a completely plugged primary orifice 36 or nozzle 38, will bias the spool valve 26 in a manner that cannot be corrected by the processor 18. Such causes may be characterized "red light" diagnostics and reported appropriately. Other root causes may result in a large deviation in the I/P signal, but all other variables in the feedback loop are operating normally. For example, the primary orifice 36 may become partially blocked so that the I/P signal will have to be driven harder in order to compensate for the degradation in flow to the nozzle. However, the error signal, the actuator pressure, and the spool valve position will all operate normally. By comparing the I/P signal deviation with other variables in the feedback loop, we can identify degradation and flag it before it becomes a catastrophic failure. These causes may be classified as "yellow light" diagnostics.

For situations in which a valve is on a travel stop, such as a valve seat, different diagnostic tests for the valve and the positioner may be required. For example, Emergency shutdown (ESD) valves are typically on-off devices that are used, for example, to shut off the flow of oil or natural gas in the event of a rupture in the pipe downstream.

As such, the ESD valve remains at the upper travel stop or in an opened condition most of the time and is only intermittently closed. A standard diagnostic test for a typical ESD device is a partial stroke test in which a reference signal to the servo moves along a predefined trajectory and sensor data are compared to a set of prediction data. However, there may be situations in which it is desirable to test a device such as a valve positioner without actually moving the valve off the travel stop. As previously described, cutoffs have been used to force full pressure on the actuator 12 and provide maximum seat load and, accordingly, maximum shutoff capability.

When the reference signal approaches 0% or 100%, the cutoffs become active, which means that the positioner may be operated in a saturated state. Thus, the control loop may be bypassed altogether and either a 100% or 0% signal may be applied directly to the I/P converter 24. As a result, the output pressure to the actuator 12 is forced to supply or to atmosphere, depending upon the desired output state. As such, when cutoffs are active it may take additional time to get the valve 10 off of the valve seat, due to additional time required to bring the I/P converter 24 and the spool valve 26 from saturated states to null states.

Since the drive signal to the I/P converter 24 is no longer active (i.e., responding to changes in the difference between the command signal and the feedback signal), it becomes more difficult to determine if the electropneumatic and pneumatic stages within the positioner are operating properly.

Figure 7:
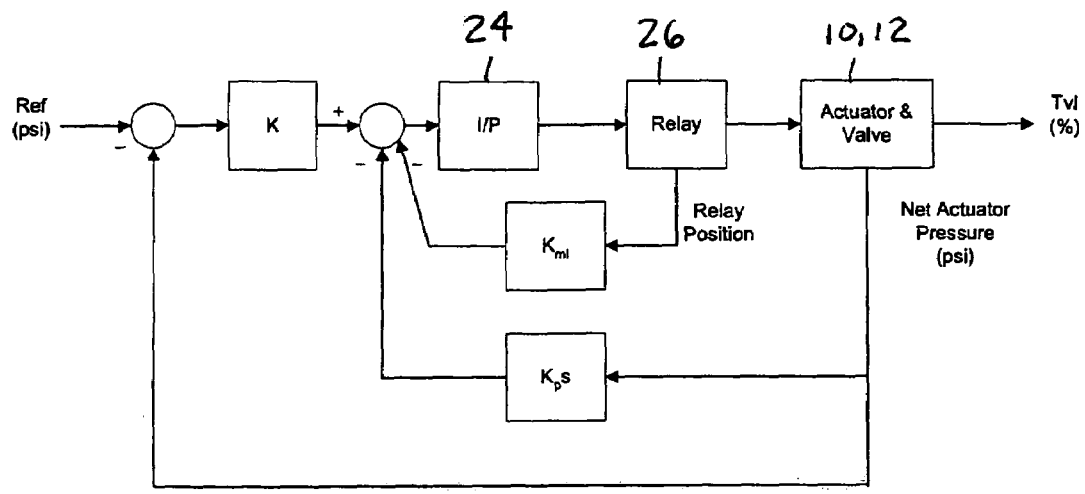
FIG. 7 is a schematic block diagram, similar to that of FIG. 1, depicting operation of the positioner using pressure control.

Thus, for certain control situations and devices, it may be desirable to run the positioner 14 in a pressure control mode when the valve 10 is on a travel stop, such as a valve seat. In a pressure control mode, the positioner 14 may be operated in a closed loop control mode as depicted in the block diagram of FIG. 7. In this mode, a pressure set point (rather than a position set point) may be selected near supply or near atmospheric pressure (i.e., near 100% or near 0%.) By doing this, near maximum seat load may be achieved, and the I/P converter 24 and the spool valve 26 or the relay 200 may be kept at their null states, allowing the valve 10 to come off its seat faster. With reference to FIG. 7, when operating in a pressure control mode, the I/P drive signal may be a function of the difference between the reference signal and a measured pressure feedback signal. For example, actuator pressure may be used as the pressure feedback signal for single-acting actuators, and the pressure differential across the piston may be used as the pressure feedback signal (error signal) for double-acting actuators. It will be appreciated a valve may be continuously operated in pressure control mode, or may be normally operated in another mode, such as travel control mode (i.e., where actuator travel is used as the control parameter), and switched to pressure control mode under certain operating conditions.

Another advantage of having the I/P converter 24 and the spool valve 26 or the relay 200 active and near null states when the valve is on the seat is that diagnostics for travel control can be used to assess the integrity of the I/P converter 24 and the spool valve 26 or the relay 200, calculate air mass flow through the spool valve 26 or the relay 200, and monitor the quality of the performance of the positioner 14. Thus, the availability of the positioner 14 may be assessed when the valve 10 is on a travel stop. The air mass flow calculations may be the same as those described above with respect to single and dual-acting actuators, and diagnostics based on air mass flow calculations similar to those described in connection with FIGS. 3A–B and 4A–C may also be performed on a control loop operating in pressure control mode.

Such diagnostic capabilities are particularly important for applications such as compressor antisurge and turbine bypass, where the valve spends most of its time on the seat, and is only occasionally called into service. However, when such a valve is needed, it is important that the valve respond as designed. Travel stop diagnostics that may be performed when the valve is on the seat and the positioner 14 is operating in a pressure control mode allow operators to assess the functionality of the positioner 14 even though the valve 10 is not operational.

Figure 9:
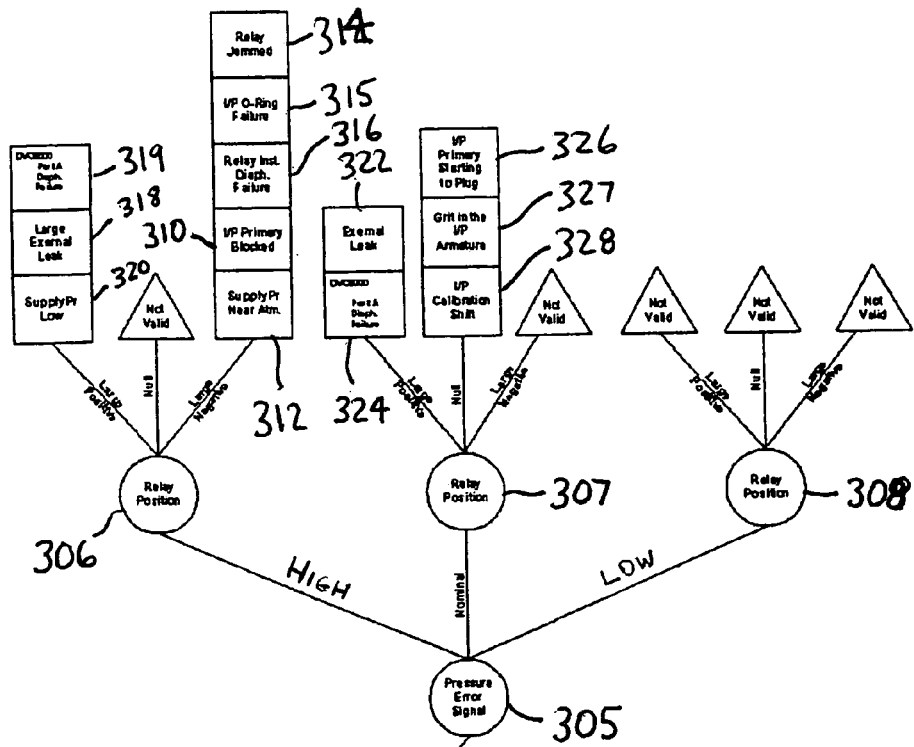
FIG. 9 is a decision tree schematically illustrating a logic sub-routine for characterizing and locating component faults when using pressure control.
Figure 9:
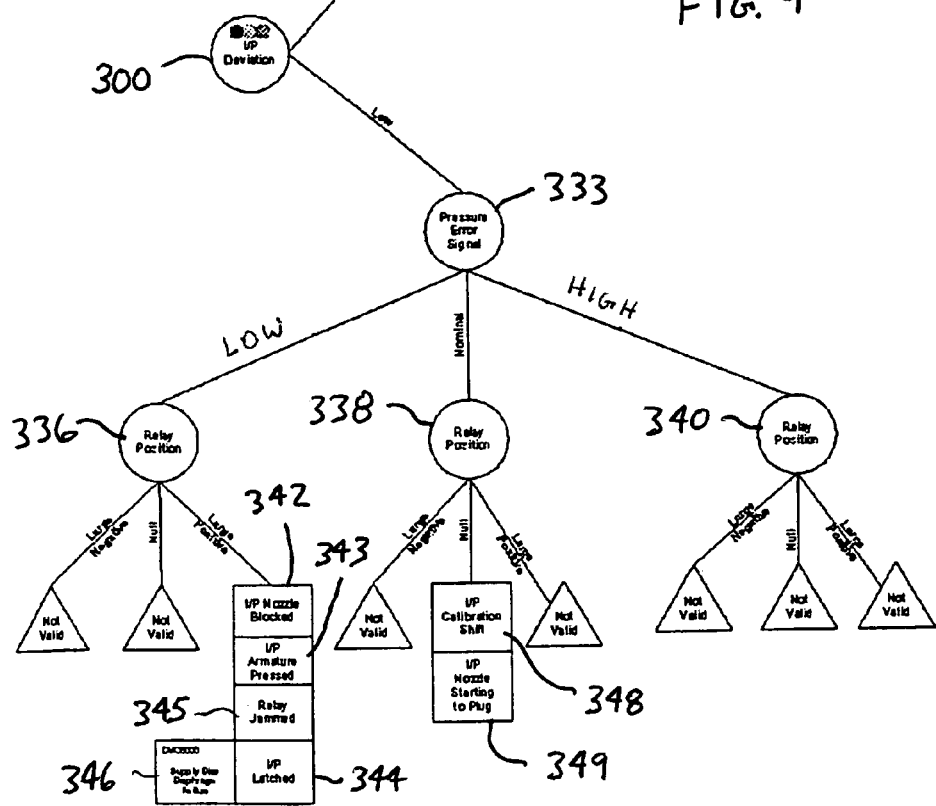

When using pressure control, faults may be mapped out using a decision tree, shown in FIG. 9, similar to that of FIG. 5. In FIG. 9, as was the case in connection with FIG. 5, measured variables are denoted by circles, the characterized values of those parameters are labeled on the lines emanating from the circles, and component failures are denoted by squares. Triangles denote invalid regions such as, for example, the combination of a large drive signal and a large negative error signal, which is not possible. The diagnostics routine illustrated in FIG. 9 is based on existing sensors commonly provided with positioners, and therefore certain component failures that are indistinguishable have been grouped together in FIG. 9. Additional sensors may be used to further distinguish the grouped component failures. Component faults cascade down through the tree until the I/P drive signal deviates. The root cause of the deviation may then be identified by moving backwards through the tree.

More specifically, at measurement 300 the diagnostics routine may be used in conjunction with a relay, such as the relay 200 shown in FIG. 6, and may detect an I/P drive signal that deviates from the normal 70% of the supply pressure. The drive signal may be characterized as high if it is above the 70% and low if it is below the 70%. If the I/P drive signal is high, the stored diagnostics routine will proceed up in the tree to characterize a reference signal used in the control loop. The reference signal may be the pressure command signal sent to the positioner from a process controller. The I/P drive signal is a function of the difference between the reference pressure signal and a pressure feedback signal.

A high I/P drive signal is first analyzed by characterizing the pressure error signal at 305. The pressure error signal may be classified as high, nominal, or low. When the I/P drive signal is high, it is not possible to have a low pressure error signal, and therefore the upper right branch 308 of FIG. 9 indicates that all outcomes are not valid. Accordingly, the only possible outcomes from the error signal characterization 305 are high or nominal. In either event, the diagnostics routine will next proceed to characterize a relay position (e.g., the position of the pneumatic relay 200 of FIG. 6), as indicated at 306 and 307 in FIG. 9. The relay position may be characterized as being largely positive, null, or largely negative.

Once the relay position has been characterized, one or more potential root causes may be identified for the I/P drive signal deviation. If, for example, the primary orifice 36 is blocked 310, the pressure supply 121 is near atmospheric pressure 312, the relay is jammed 314, the I/P O-ring 46 has failed 315, or a relay instrumentation diaphragm associated with the chamber 228 has failed 316, the diagnostics routine will have characterized the fault as having a largely negative spool position, high pressure error signal for a high I/P drive signal. If the fault is characterized as having a largely positive relay position, a high pressure error signal for a high I/P drive signal, the root cause may be an external leak 318, a diaphragm associated with the first orifice 220 has failed 319, or a low supply pressure 320.

If, for a high I/P drive signal, the pressure error signal is nominal, the pressure differential is positive, and the relay position is largely positive, the root cause may be an external leak 322, or a diaphragm associated with the first orifice 220 has failed 324.

If the relay position is characterized as null and the pressure error signal is nominal for a high I/P drive signal, the root cause for the fault may be a primary orifice 36 that is partially plugged 326, the presence of grit in the I/P flapper or armature 327, or an I/P calibration shift 328.

Turning to the bottom half of FIG. 9, the diagnostics routine may conduct a similar process for a low I/P drive signal. The analysis proceeds by characterizing the pressure error signal at 333. Error signal characterization is similar to that at 305 described above, wherein the pressure error signal may be low, nominal, or high. It is not possible to have both a low I/P drive signal and a high pressure error signal, and therefore the outcomes show at 340 in the lower right portion of FIG. 9 are all indicated as being not valid. After pressure error signal characterization, the diagnostics routine will characterize the position of the relay at 336 and 338.

As with a high drive signal deviation, analysis of a low drive signal deviation proceeds with identifying one or more possible root causes. If the pressure error signal is low and the relay position is largely positive, the root cause for the fault may be a nozzle 38 that is blocked 342, a pressed I/P flapper or armature 343, a latched I/P 344, a jammed relay 345, or a failure of the a diaphragm associated with the reference chamber 230 has failed 346. Finally, if the pressure error signal is nominal and the relay position is null, the root cause for the fault may be an I/P calibration shift 348, or a nozzle 38 that is partially plugged 349.

Figure 10:
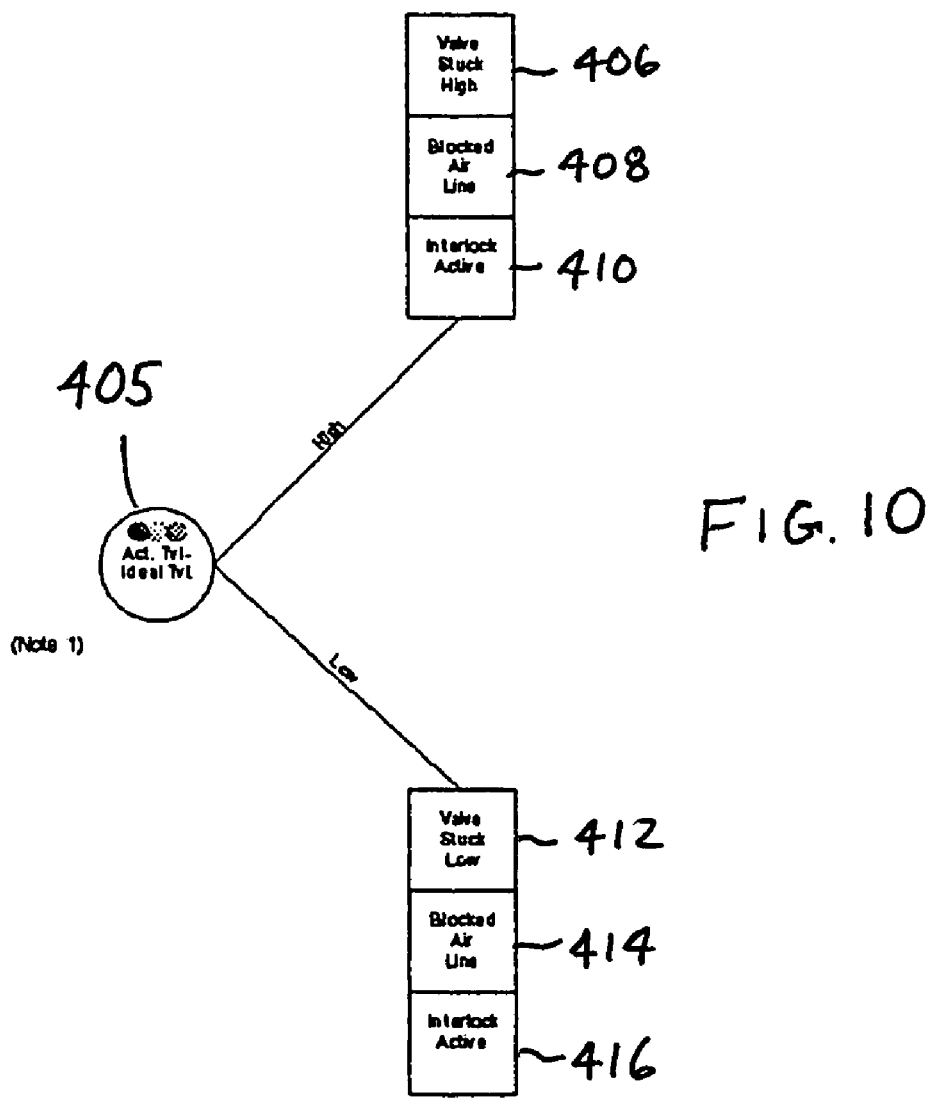
FIG. 10 is a decision tree schematically illustrating a logic sub-routine for characterizing and locating component faults when using pressure control in combination with a valve travel sensor.

If desired, further actuator performance diagnostics may be implemented when in a pressure control mode by using actuator position sensor feedback, as shown in the decision tree of FIG. 10. If, for example in a fail-close device, pressure control is operating nominally, but the valve 10 has not moved to a commanded position, a positive or negative actuator travel error may be characterized at 405. If the actuator travel error is positive, possible actuator faults are a valve stuck in a high position 406, a blocked air line 408, or an active interlock 410. If the actuator travel error is negative, possible actuator faults are a valve stuck in a low position 412, a blocked air line 414, or an active interlock 416.

In addition to using pressure control when the valve 10 is on the seat, one can use pressure control as a fallback should the travel sensor 68 fail. Throttling control of the valve 10 may not always be as precise with pressure control as it is with travel control, but it is usually good enough to keep the valve 10 operating and the process running. Even so, one can apply the diagnostics developed for travel control when the positioner is operating in pressure control.

In summary, two examples have been provided for the use of pressure control diagnostics in a positioner and both examples provide an extension of the range of operation over which on-line diagnostics can be used: pressure control while the valve is on the seat (or at an upper travel stop); and when pressure control is used as a backup for throttling control in the event of a travel sensor failure.

While the diagnostics unit has been described as preferably performing processing and diagnostics using software, it may use hardware, firmware, etc. using any type of processor, such as an ASIC, etc. In any event, the recitation of a routine stored in a memory and executed on a processor includes hardware and firmware devices as well as software devices. For example, the elements described herein may be implemented in a standard multi-purpose CPU or on specifically designed hardware or firmware such as an application-specific integrated circuit (ASIC) or other hard-wired devices as desired and still be a routine executed in a processor. When implemented in software, the software routine may be stored in any computer readable memory such as on a magnetic disk, a laser disk, an optical disk, or other storage medium, in a RAM or ROM of a computer or processor, in any database, etc. Likewise, this software may be delivered to a user or a process plant via any known or desired delivery method including, for example, on a computer readable disk or other transportable computer storage mechanism or over a communication channel such as a telephone line, the internet, etc. (which are viewed as being the same as or interchangeable with providing such software via a transportable storage medium). Similarly, as used herein, a processor may include a programmable device, such as a microprocessor, or any hardwired or permanent memory device, such as an ASIC.

The foregoing detailed description has been given for clearness of understanding only, and no unnecessary limitations should be understood therefrom, as modifications will be obvious to those skilled in the art.

What is claimed is:

1. A method of operating a control loop for a control valve having a throttling element coupled to a pneumatically operated actuator defining at least a first control chamber, the control loop including a pneumatic amplifier having an inlet port in fluid communication with a supply of control fluid, a first outlet port in fluid communication with the first control chamber of the actuator, and a control fluid valve assembly responsive to a control pressure signal for controlling flow of control fluid between the inlet port and the first outlet port; and an I/P converter adapted to receive an I/P drive signal and generate the control pressure signal, the method comprising:
   storing a reference outlet pressure signal;
   generating the I/P drive signal based on the reference outlet pressure signal;
   receiving a measurement of a pressure level of control fluid from at least the pneumatic amplifier first outlet port;
   comparing the measured pressure level to the reference outlet pressure signal to generate an error signal; and
   modifying the I/P drive signal based on the error signal.

2. The method of claim 1, in which the reference outlet pressure signal is generated in response to engagement of the throttling element with a travel stop.

3. The method of claim 2, in which the travel stop comprises a valve seat.

4. The method of claim 2, in which the travel stop comprises an upper travel stop.

5. The method of claim 1, in which the reference outlet pressure signal is near 100%.

6. The method of claim 1, in which the reference outlet pressure signal is near 0%.

7. The method of claim 1, in which the control valve further includes a travel sensor adapted to detect detecting a position of the throttling element, and in which the reference outlet pressure signal is generated in response to a failure of the travel sensor.

8. The method of claim 1, further comprising performing a diagnostics routine based on at least one control parameter of the control loop.

9. The method of claim 8, in which the diagnostics routine includes:
   receiving a measurement of an inlet port pressure value corresponding to control fluid pressure at the inlet port;
   receiving a measurement of a first outlet port pressure value corresponding to control fluid pressure at the first outlet port;
   receiving a measurement of a control fluid valve assembly travel value corresponding to a position of the control fluid valve assembly;
   calculating a first outlet port area of restriction based on the control fluid valve assembly travel value; and
   calculating a first outlet port mass flow rate based on the inlet pressure value, first outlet port pressure value, and first outlet port area of restriction.

10. The method of claim 9, in which the diagnostics routine further includes:
   generating a first mass flow profile; and applying a logic sub-routine to determine a fault condition based on a comparison of the calculated first outlet port mass flow rate and the first mass flow profile.

11. The method of claim 8, in which the diagnostics routine includes:
defining a normal range for the at least one control parameter of the control loop;
triggering a fault signal for operation of the control parameter outside of the normal range;
characterizing operating parameters of the control loop during the fault signal to derive a fault template;
comparing the fault template to sets of stored operating parameters associated with specific component failures; and
identifying at least one specific component failure having a set of stored operating parameters that matches the fault template.

12. The method of claim 8, in which the actuator further defines a second control chamber and the pneumatic amplifier includes a second outlet port in fluid communication with the actuator second control chamber, wherein the control fluid valve assembly further controls flow of fluid from the inlet port to the second outlet port, the method further comprising:
receiving a measurement of a second outlet port pressure level of control fluid at the pneumatic amplifier second outlet port;
comparing the second outlet port pressure level to the first outlet port pressure level to determine a pressure differential value; and
comparing the pressure differential value to the reference outlet pressure signal to generate the error signal.

13. The method of claim 12, in which the diagnostics routine includes:
receiving a measurement of an inlet port pressure value corresponding to control fluid pressure at the inlet port;
receiving a measurement of a first outlet port pressure value corresponding to control fluid pressure at the first outlet port;
receiving a measurement of a second outlet port pressure value corresponding to control fluid pressure at the first outlet port;
receiving a measurement of a control fluid valve assembly travel value corresponding to a position of the control fluid valve assembly;
calculating a first outlet port area of restriction and a second outlet port area of restriction based on the control fluid valve assembly travel value;
calculating a first outlet port mass flow rate based on the inlet pressure value, first outlet port pressure value, and first outlet port area of restriction; and
calculating a second outlet port mass flow rate based on the inlet pressure value, second outlet port pressure value, and second outlet port area of restriction.

14. The method of claim 13, in which the diagnostics routine further includes:
receiving at least a first mass flow profile; and
applying a logic sub-routine to determine a fault condition based on a comparison of the at least one of the calculated first and second outlet port mass flow rates with the first mass flow profile.

15. The method of claim 1, in which the actuator further defines a second control chamber and the pneumatic amplifier includes a second outlet port in fluid communication with the actuator second control chamber, wherein the control fluid valve assembly further controls flow of fluid from the inlet port to the second outlet port, the method further comprising:
receiving a measurement of a second outlet port pressure level of control fluid at the pneumatic amplifier second outlet port;
comparing the second outlet port pressure level to the first outlet port pressure level to determine a pressure differential value;
comparing the pressure differential value to the reference outlet pressure signal to generate a pressure differential error signal; and
modifying the I/P drive signal based on the pressure differential error signal.

16. The method of claim 1, in which the pneumatic amplifier comprises a spool valve.

17. The method of claim 1, in which the pneumatic amplifier comprises a pneumatic relay.

18. A method of selectively operating a control loop for a control valve in either a travel control mode or a pressure control mode, wherein the control valve has a throttling element coupled to a pneumatically operated actuator defining at least a first control chamber, and in which the control loop includes a pneumatic amplifier having an inlet port in fluid communication with a supply of control fluid, a first outlet port in fluid communication with the actuator first control chamber, and a control fluid valve assembly responsive to a control pressure signal for controlling flow of control fluid between the inlet port and the first outlet port; and an I/P converter adapted to receive an I/P drive signal and generate the control pressure signal; the method comprising:
operating the control loop in travel control mode by:
storing a reference travel signal;
generating the I/P drive signal based on the reference travel signal;
receiving a measurement of a throttling element travel value corresponding to a position of the throttling element;
comparing the measured throttling element travel value to the reference travel signal to generate a travel error signal; and
modifying the I/P drive signal based on the travel error signal; and
operating the control loop in pressure control mode by:
storing a reference outlet pressure signal;
generating the I/P drive signal based on the reference outlet pressure signal;
receiving a measurement of a first outlet port pressure level of control fluid at the pneumatic amplifier first outlet port;
comparing the measured first outlet port pressure level to the reference outlet pressure signal to generate a outlet pressure error signal; and
modifying the I/P drive signal based on the outlet pressure error signal.

19. The method of claim 18, in which the control loop is normally operated in the travel control mode.

20. The method of claim 19, in which the control loop is switched to the pressure control mode in response to engagement of the throttling element with a travel stop.

21. The method of claim 20, in which the travel stop comprises a valve seat.

22. The method of claim 20, in which the travel stop comprises an upper travel stop.

23. The method of claim 19, in which the control loop is switched to the pressure control mode in response to the reference outlet pressure signal nearing 100%.

24. The method of claim 19, in which the control loop is switched to the pressure control mode in response to the reference outlet pressure signal nearing 0%.

25. The method of claim 19, in which the control loop is switched to the pressure control mode when the throttling element travel value fails.

26. The method of claim 18, further comprising performing a diagnostics routine based on at least one control parameter of the control loop.

27. A positioner system adapted to control a pneumatic actuator coupled to a throttling element, the actuator having at least a first control chamber, the positioner system comprising:
   a processor and a memory, the processor adapted to receive an outlet pressure set point and generate an I/P drive signal;
   an I/P converter operatively coupled to the processor and adapted to generate a pneumatic control signal in response to the I/P drive signal;
   a pneumatic amplifier operatively coupled to the I/P converter, the pneumatic amplifier having an inlet port in fluid communication with a supply of control fluid, a first outlet port in fluid communication with the actuator first control chamber, and a control fluid valve assembly adapted to control flow of control fluid from the inlet port to the first outlet port in response to the pneumatic control signal; and
   a first outlet port pressure sensor adapted to detect a pressure level at the first outlet port and generate a first outlet port pressure signal, wherein the first outlet port pressure sensor is communicatively coupled to the processor;
   wherein the processor is adapted to compare the first outlet port pressure signal to the outlet pressure set point and generate an outlet pressure error signal, and wherein the processor is adapted to modify the I/P drive signal based on the outlet pressure error signal.

28. The system of claim 27, in which the processor includes a routine adapted to perform diagnostics based on at least one control parameter of the positioner system.

29. The system of claim 28, further comprising a displacement sensor adapted to detect a control fluid valve assembly position and an inlet pressure sensor in fluid communication with the inlet port adapted to detect an inlet port pressure, wherein the displacement and inlet pressure sensors are communicatively coupled to the processor.

30. The system of claim 29, in which the diagnostics routine is adapted to generate a first outlet port area of restriction based on the control fluid valve assembly position and calculate a first outlet port mass flow rate of control fluid based on inlet port pressure, first outlet port pressure, and first outlet port area of restriction.

31. The system of claim 28, in which the diagnostics routine is adapted to:
   define a normal range for the at least one control parameter;
   trigger a fault signal for operation of the control parameter outside of the normal range;
   characterize operating parameters of the positioner system during the fault signal to derive a fault template;
   compare the fault template to sets of stored operating parameters associated with specific component failures; and
   identify at least one specific component failure having a set of stored operating parameters that matches the fault template.

32. The system of claim 27, in which the actuator includes a second control chamber, and in which the pneumatic amplifier further includes a second outlet port in fluid communication with the actuator second control chamber, wherein the control fluid valve assembly also controls flow of control fluid from the inlet port to the second outlet port, the system further comprising a second outlet port pressure sensor adapted to detect a pressure level at the second outlet port and generate a second outlet port pressure signal, wherein the second outlet port pressure sensor is communicatively coupled to the processor.

33. The system of claim 32, in which the processor is adapted to compare the first outlet port pressure signal to the second outlet port pressure signal and generate an outlet pressure differential signal, to compare the outlet pressure differential signal to the outlet pressure set point and generate the outlet pressure differential error signal, and to modify the I/P drive signal based on the outlet pressure differential error signal.

34. A positioner system adapted to control a pneumatic actuator coupled to a throttling element, the actuator having at least a first control chamber, the positioner system comprising:
   a processor and a memory, the processor adapted to receive a travel set point and an outlet pressure set point and generate an I/P drive signal based on at least one of the travel and outlet pressure set points;
   an I/P converter operatively coupled to the processor and responsive to the I/P drive signal to generate a pneumatic control signal;
   a pneumatic amplifier operatively coupled to the I/P converter, the pneumatic amplifier having an inlet port in fluid communication with a supply of control fluid, a first outlet port in fluid communication with the actuator first control chamber, and a control fluid valve assembly responsive to the pneumatic control signal to control flow of control fluid from the inlet port to the first outlet port;
   a first outlet port pressure sensor adapted to detect a pressure level at the first outlet port and generate a first outlet port pressure signal, wherein the first outlet port pressure sensor is communicatively coupled to the processor; and
   a throttling element travel sensor adapted to detect a position of the throttling element and generate a throttling element position signal, wherein the throttling element travel sensor is communicatively coupled to the processor;
   wherein the processor is adapted to operate in a travel control mode in which, the throttling element position signal is compared to the travel set point to generate a travel error signal, wherein the I/P drive signal is modified by the travel error signal, and in a pressure control mode in which the first outlet port pressure signal is compared to the outlet pressure set point to generate an outlet pressure error signal, wherein the I/P drive signal is modified by the outlet pressure error signal.

35. The system of claim 34, in which the processor is normally operated in the travel control mode.

36. The system of claim 35, in which the processor is switched to the pressure control mode in response to engagement of the throttling element with a travel stop.

37. The system of claim 36, in which the travel stop comprises a valve seat.

38. The system of claim 36, in which the travel stop comprises an upper travel stop.

39. The system of claim 35, in which the control loop is switched to the pressure control mode in response to the reference outlet pressure signal nearing 100%.

40. The system of claim 35, in which the control loop is switched to the pressure control mode in response to the reference outlet pressure signal nearing 0%.

41. The system of claim 35, in which the control loop is switched to the pressure control mode when the throttling element position signal fails.

42. The system of claim 34, in which the processor includes a routine adapted to perform diagnostics based on at least one control parameter of the positioner system.

43. A method of detecting faults in a control loop for a control valve having a throttling element coupled to a pneumatically operated actuator, the control loop including a pneumatic amplifier operatively coupled to the actuator and having a control fluid valve assembly responsive to a control pressure signal for controlling flow of control fluid to the actuator, and an I/P converter operatively coupled to the pneumatic amplifier for generating the control pressure signal in response to an I/P drive signal, wherein the I/P drive signal is based on a reference outlet pressure signal, the method comprising:

storing a normal range for a control parameter of the control loop;

triggering a fault signal for operation of the control parameter outside the normal range;

characterizing operating parameters of the control loop during the fault signal to derive a fault template;

comparing the fault template to sets of stored operating parameters associated with specific component failures; and identifying at least one specific component failure having a set of stored operating parameters that matches the fault template.

44. The method of claim 43, in which the pneumatic amplifier comprises a spool valve, and in which the control parameter comprises a spool valve position signal.

45. The method of claim 43, in which the pneumatic amplifier comprises a pneumatic relay having a beam, and in which the control parameter comprises a beam position signal.

46. The method of claim 43, in which the control parameter comprises an I/P drive signal.

47. The method of claim 43, in which characterization of the operating parameters includes:

characterizing an I/P drive signal deviation as high or low;

characterizing an outlet pressure error signal as high, nominal or low, wherein the outlet pressure error signal is equal to an outlet pressure reference signal minus a measured outlet pressure signal; and characterizing a control fluid valve assembly position as largely positive, null, or largely negative.

48. The method of claim 43, in which a fault template comprising a high I/P drive signal deviation, a high outlet pressure error signal, and largely negative control fluid valve assembly position is attributable to one of a group of component faults consisting of a jammed control fluid valve assembly, an I/P O-ring failure, a diaphragm failure, a blocked primary orifice, and a supply pressure near atmospheric pressure.

49. The method of claim 43, in which a fault template comprising a high I/P drive signal deviation, a high outlet pressure error signal, and largely positive control fluid valve assembly position is attributable to one of a group of component faults consisting of an external leak, a pneumatic amplifier diaphragm failure, and a low supply pressure.

50. The method of claim 43, in which a fault template comprising a high I/P drive signal deviation, a nominal outlet pressure error signal, and largely positive control fluid valve assembly position is attributable to one of a group of component faults consisting of an external leak and a pneumatic amplifier diaphragm failure.

51. The method of claim 43, in which a fault template comprising a high I/P drive signal deviation, a nominal outlet pressure error signal, and a null control fluid valve assembly position is attributable to one of a group of component faults consisting of a partially plugged primary orifice, grit in the armature, and a shift in I/P calibration.

52. The method of claim 43, in which a fault template comprising a low I/P drive signal deviation, a low output pressure error signal, and largely positive control fluid valve assembly position is attributable to one of a group of component faults consisting of a blocked I/P nozzle, a pressed I/P armature, a latched I/P, a jammed control fluid valve assembly, and a supply bias diaphragm failure.

53. The method of claim 43, in which a fault template comprising a low I/P drive signal deviation, a nominal outlet pressure error signal, and a null control fluid valve assembly position is attributable to one of a group of component faults consisting of a shift in I/P calibration and a partially plugged I/P nozzle.

54. The method of claim 43, in which the reference outlet pressure signal is generated in response to engagement of the throttling element with a travel stop.

55. The method of claim 54, in which the travel stop comprises a valve seat.

56. The method of claim 54, in which the travel stop comprises an upper travel stop.

57. The method of claim 43, in which the reference outlet pressure signal is near 100%.

58. The method of claim 43, in which the reference outlet pressure signal is near 0%.

59. The method of claim 43, in which the control valve further includes a travel sensor adapted to detect a position of the throttling element, and in which the reference outlet pressure signal is generated in response to a failure of the travel sensor.

60. A positioner system adapted to control a pneumatic actuator coupled to a throttling element, the actuator having at least a first control chamber, the positioner system comprising:

a processor and a memory, the processor receiving an outlet pressure set point and generating an I/P drive signal;

an I/P converter operatively coupled to the processor and responsive to the I/P drive signal to generate a pneumatic control signal;

a pneumatic amplifier operatively coupled to the I/P converter, the pneumatic amplifier having an inlet port in fluid communication with a supply of control fluid, a first outlet port in fluid communication with the actuator first control chamber, and a control fluid valve assembly adapted to control flow of control fluid from the inlet port to the first outlet port in response to the pneumatic control signal;

a first outlet port pressure sensor adapted to detect a pressure level at the first outlet port and generate a first outlet port pressure signal, wherein the first outlet port pressure sensor is communicatively coupled to the processor, wherein the processor is adapted to compare the first outlet port pressure signal to the outlet pressure set point and generate an outlet pressure error signal, and wherein the processor is adapted to modify the I/P drive signal based on the outlet pressure error signal;

a second sensor communicatively coupled to the processor and adapted to detect a control parameter of the positioner system; and a diagnostics routine stored in the memory and adapted to be executed on diagnostics information based on at least one diagnostics parameter selected from the group of parameters including the first outlet port pressure level and the control parameter wherein the processor is further adapted to compare the first outlet port pressure signal and the outlet pressure set point to generate an outlet pressure error signal, and wherein the processor is adapted to modify the I/P drive signal based on the outlet pressure error signal.

61. The system of claim 60, in which the diagnostics routine is further adapted to:

define a normal range for the diagnostics parameter;

trigger a fault signal for operation of the diagnostics parameter outside of the normal range;

characterize selected operating parameters of the positioner system during the fault signal to derive a fault template;

compare the fault template to sets of stored operating parameters associated with specific component failures; and identify at least one specific potential component failure having a set of stored operating parameters corresponding to the fault template.

62. The system of claim 61, in which the control fluid valve assembly comprises a spool valve, and in which the control parameter comprises a spool valve position signal.

63. The system of claim 61, in which the control fluid valve assembly comprises a pneumatic relay having a beam, and in which the control parameter comprises a beam position signal.

64. The system of claim 61, in which the control parameter comprises an I/P drive signal.

65. The system of claim 61, in which the actuator includes a second control chamber, and in which the pneumatic amplifier further includes a second outlet port in fluid communication with the actuator second control chamber, wherein the control fluid valve assembly is further adapted to control flow of control fluid from the inlet port to the second outlet port, wherein the system further comprises a second outlet port pressure sensor adapted to detect a pressure level at the second outlet port and generate a second outlet port pressure signal, wherein the second outlet port pressure sensor is communicatively coupled to the processor.

66. The system of claim 65, in which the processor is adapted to compare the first outlet port pressure signal and the second outlet port pressure signal to generate an outlet pressure differential signal, to compare the outlet pressure differential signal to the outlet pressure set point to generate an outlet pressure differential error signal, and to modify the I/P drive signal based on the outlet pressure differential error signal.

67. The system of claim 66, further comprising a displacement sensor adapted to detect a control fluid valve assembly position, and in which the diagnostics routine is further adapted to:

characterize an I/P drive signal deviation as high or low;

characterize the output pressure differential error signal as high, null, or low; and characterize the control fluid valve assembly position as largely positive, null, or largely negative.

* * * * *

UNITED STATES PATENT AND TRADEMARK OFFICE
CERTIFICATE OF CORRECTION

PATENT NO. : 6,999,853 B2
APPLICATION NO. : 10/828706
DATED : February 14, 2006
INVENTOR(S) : Kenneth W. Junk et al.

It is certified that error appears in the above-identified patent and that said Letters Patent is hereby corrected as shown below:

On Title Page, Item -56-

In Other Publications, first reference cited, "2, pp." should be --2, 1991, pp. --.

At Column 7, line 34, "At" should be -- At a --.

At Column 8, line 65, "outlet-ring" should be -- outlet O-ring --.

At Column 13, line 31, "appreciated a" should be -- appreciated that a --.

In Claim 7, at Column 16, line 42, "detect detecting" should be -- detect --.

In Claim 18, at Column 18, line 54, "a" should be -- an --.

In Claim 34, at Column 20, line 54, "which," should be -- which --.

Signed and Sealed this

First Day of May, 2007

JON W. DUDAS
*Director of the United States Patent and Trademark Office*